United States Patent [19]

Prioste

[11] 4,159,520
[45] Jun. 26, 1979

[54] MEMORY ADDRESS CONTROL DEVICE WITH EXTENDER BUS

[75] Inventor: Jerry E. Prioste, Scottsdale, Ariz.

[73] Assignee: Motorola, Inc., Schaumburg, Ill.

[21] Appl. No.: 756,152

[22] Filed: Jan. 3, 1977

[51] Int. Cl.² .............................................. G06F 13/00
[52] U.S. Cl. ................................................. 364/200
[58] Field of Search ........................ 364/200 MS File

[56] References Cited

U.S. PATENT DOCUMENTS

| | | | |
|---|---|---|---|
| 3,665,402 | 5/1972 | Greenspan et al. | 364/200 |
| 3,736,567 | 5/1973 | Lotan et al. | 364/200 |
| 3,766,527 | 10/1973 | Briley | 364/200 |
| 3,972,024 | 7/1976 | Shroeder et al. | 364/200 |

OTHER PUBLICATIONS

IBM 7080 Data Processing System (Reference Manual A22-6560-1), 1961, pp. 12-19, 25-28, 31-36, 62-64, cover page & preface.
"A Primer on Bit-Slice Processors", —Nemec et al—Electronic Design 3, Feb. 1977, —pp. 52-60.

*Primary Examiner*—Harvey E. Springborn
*Attorney, Agent, or Firm*—Anthony J. Sarli, Jr.

[57] ABSTRACT

A control memory address generation device, for use as a single device or in a slice environment, performs logical and/or data path selection functions with respect to control information from an arithmetic and logic unit or a control word field, or both, to generate the next control memory address. A flexible register organization and extender bus logic allows subroutining control, instruction or subroutine repetition, masking, branching (conditional or unconditional), and other address-related operations.

6 Claims, 8 Drawing Figures

MEMORY ADDRESS CONTROL DEVICE WITH EXTENDER BUS

BACKGROUND OF THE INVENTION

1. Field of the Invention

This invention relates to memory address control devices, and more specifically to a memory address control device which may be used alone or in conjunction with one or more additional control devices, as in a slice processor arrangement, to provide a memory addressing circuit which is highly flexible in its ability to provide addresses to a memory from a plurality of sources or logically derived from a plurality of sources.

2. Description of the Prior Art

Microprogrammable processors conventionally provide an arithmetic and logic unit and an associated register file by which logical or arithmetic operations are performed upon data contained in a primary memory or main storage section of the computer. The primary storage is conventionally accessed through a memory interface unit. Associated with the memory interface unit, the arithmetic and logic unit and the register file is a microprogram control device which provides addresses to a control memory, decodes the instructions contained at the addressed locations of a control memory, and provides control signals to the arithmetic and logic unit, register file, memory interface and control memory.

In the past, the microprogram control device has had limited logical capability in that, in one class of machine, the address of the next microinstruction is provided by the currently executing microinstruction. In another class of machine, a limited capability in the microprogram control device is provided to sequentially access microinstructions by means of a microinstruction program counter which may be incremented upon execution of each successive microinstruction. Such devices usually provide an additional limited capability for executing jump, subroutine and return instructions, the addresses of which may be logically derived from control signals derived from the decoded executing microinstruction.

SUMMARY OF THE INVENTION

The instant invention provides a mechanism for interconnecting a plurality of functional devices associated with a computing system, such as memory address generating devices, such that an operation performed in one of the plurality of devices may be carried to the others of the devices. The invention further provides a means for convenient instruction repetition and subroutine repetition, particularly where the operations involve counting to be performed on more than one of the functional devices.

BRIEF DESCRIPTION OF THE DRAWINGS

The features of the invention will become more apparent from the following detailed description of the preferred embodiment of the invention when taken in conjunction with the accompanying drawings, in which.

DETAILED DESCRIPTION OF THE PREFERRED EMBODIMENT

Figure 1:
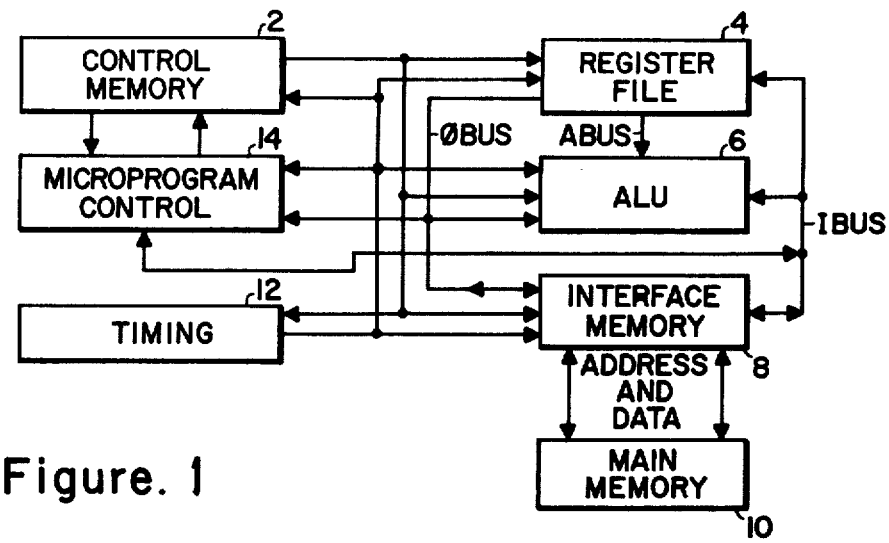
FIG. 1 is a block diagram of a microprogrammable system utilizing the microprogram control device of the instant invention.

In a microprogrammed processor, such as is shown in FIG. 1, the microprogram instructions may be contained in control memory 2. Depending upon system requirements and size, the control memory 2 can vary from a few hundred words to several thousand words of microinstructions. The size and organization of the microinstructions is determined by the system designer based upon the number of functions, buses, registers, and the like to be controlled in the specific application toward which the processor system is directed. The control memory 2 may be constructed with programmable read only memories such as part number MCM10149 or by random access memory chips such as part number MCM10144 or MCM10146, all of which parts are available from Motorola, Inc.

As previously noted, in a microprogrammed processor the information for executing a machine function (a macroinstruction) is contained within the control memory 2. Control memory outputs go to a register file 4, the arithmetic and logic unit 6 and a memory interface 8. The control memory outputs control the specific function performed by each of the elements of the system. The number of control memory steps or microinstructions required to execute a macroinstruction which forms a part of user program and is typically contained within the main memory unit 10, is determined by the complexity of the instruction. The general principles of microprogramming are well known, and it is well known that macroinstructions of varying complexity may be executed by from 1 or 2 mircroinstructions, for a simple register to register addition function, to a large number of microinstructions, sequentially executed, which may be required for a complex operation such as a multiply or floating point arithmetic calculation.

A suitable arithmetic and logic unit for use in this system may be part number MC10800, which part is available from Motorola, Inc.

The memory interface 8 and the main memory 10 may be, for purposes of this disclosure, of conventional design, the structure and function of which are well known to practitioners in the art. A particularly suitable memory interface device is that set forth in co-pending U.S. patent application Ser. No. 756,170, assigned to the assignee of the instant invention. A timing device 12 is provided from which a system clock emanates timing signals to sequence the operations of the system. Any single or multiple phase clock system would be suitable.

The heart of the microprogrammable system is the microprogram control logic 14. This device, which in a preferred embodiment may be a monolithic semiconductor chip, holds the presently used control memory word address and controls the machine sequencing to execute processor operations. In a preferred embodiment, the microprogram control device is four bits wide and may be utilized in parallel with similar devices to form a control memory address capability of any width desired based upon the control memory size requirements for the specific application of the machine. Additionally, while the ALU earlier referenced may also be four bits wide, several ALU chips may be utilized in parallel to perform logical operations on data words of greater length than four bits. The specific part numbers recited above, then, may be operated as a four-bit processor or as a four-bit slice of a larger processor unit as will be hereinafter described.

A set of sixteen instructions, in this preferred embodiment, address the microprogram control device 14 and control the sequencing of the microprogram storage. The flexible register arrangement of the microprogram control device, which will be later described, allows powerful branching and subrouting and additional operations.

Figure 2:
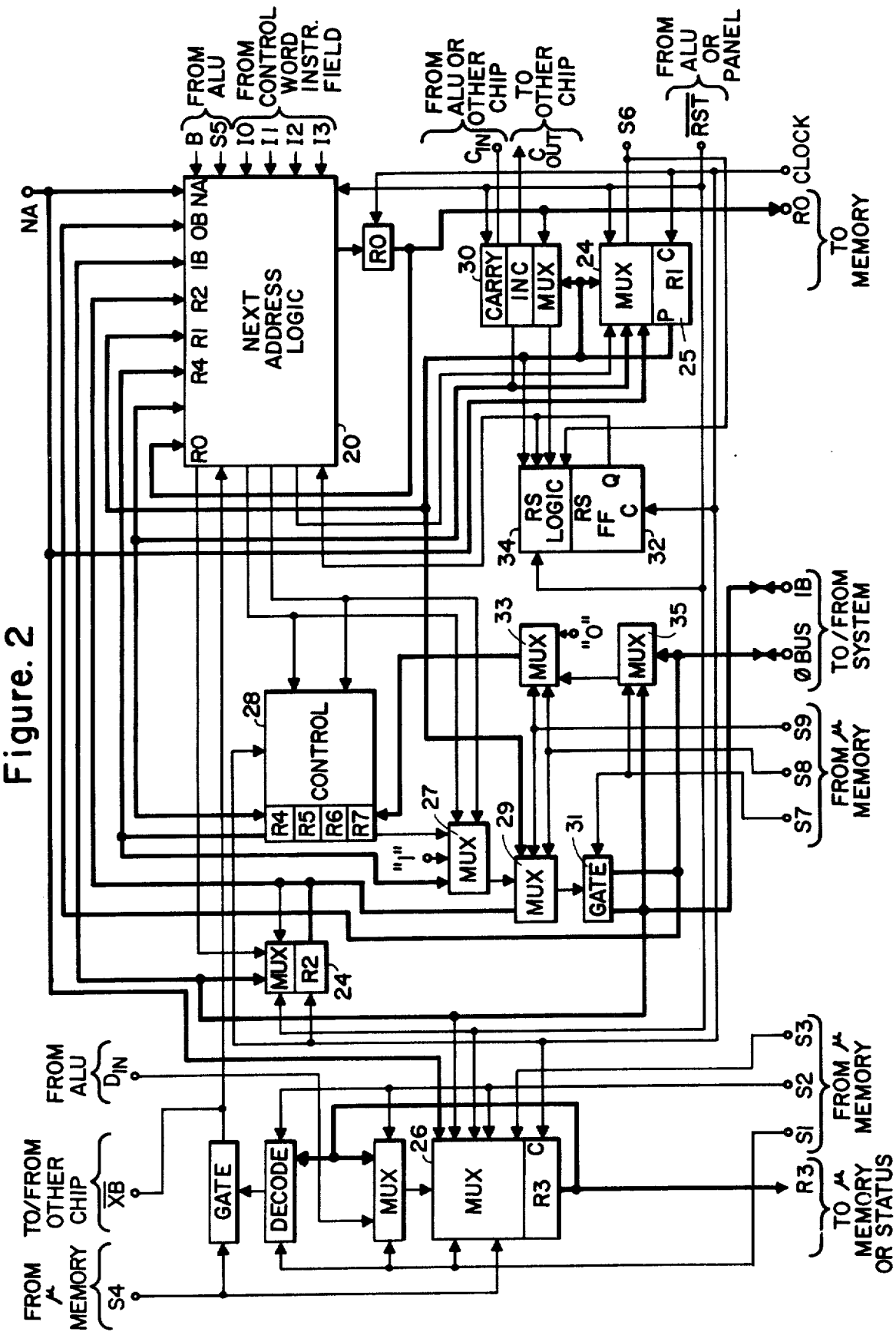
FIG. 2 is a logic block diagram of the microprogram control device of the invention.

FIG. 2 shows a register-level block diagram of a microprogram control device 14.

In a preferred embodiment, the microprogram control device comprises eight master-slave control registers, R0 through R7. Additional gates, multiplexers 24, 26, 28, and a next address logic block 20 transfer information to and from the control registers. Five four-bit data ports R0, R3, next address (NA), I Bus and O Bus are available to enter and output address information. In addition, three single line terminals B, $\overline{XB}$ and $D_{IN}$ provide status inputs for decisions within the control memory device.

The individual registers and data transfer paths are shown in FIG. 2 and will be described below

R0-Control Memory Address Register

Register R0 holds the present microprogram control memory address and its outputs are coupled to the R0 data port. In a system as shown in FIG. 1, these outputs address the control memory storage block 2. The next address logic block 20 generates the next address information and provides the same to the R0 register inputs. A clock signal loads the new control memory address into R0 which in turn selects the next microinstruction from the control memory 2.

Inputs to R0 come from three external sources, IB, $\phi$B, and NA; and five internal sources, R0, R1, R2, R4 (stack) and the incrementer. Selection of the R0 inputs and control of registers R1 and R4 is accomplished by decoding inputs B, $\overline{XB}$, S5, $I_0$, $I_1$, $I_2$, $I_3$ and $\overline{RST}$ in the next address logic block, R0 can be reset synchronously. The reset signal also causes R0 to be pushed on to R1 and R4 (with the incrementer disabled) when clocked. The NA field would normally be a jump address coming from the control memory. This field is also used to modify inputs R1, R2, $\phi$B and IB by "ANDing" the individual bits. In one branch instruction the NA field can be modified by the branch bits B and XB. B is "ANDed" with $NA_0$ and XB "ANDed" with $NA_1$. This can offer branches to more than one location.

Address Logic

The next address logic block 20 performs, in a preferred embodiment, sixteen sequence instructions as selected by the instruction control lines I0 through I3. These sixteen control instructions are shown in Table 1 of the Appendix hereto and determine the source of control memory address information within the microprogram control device. Possible sources for input to the next address logic 20 are R0, R1, R2, R4, NA inputs, I Bus, $\phi$Bus, and the incrementer. Each of these inputs is shown as a heavy dark line at the top of the next address logic block 20. Throughout the description of FIG. 2, the heavy dark lines are meant to represent four-bit bus lines, and the thin lines to represent single-bit signal lines. During each microinstruction cycle, the next address block 20 generates a new control memory address in parallel with other processor functions, such as the ALU function.

R1-Repeat Register

Register R1 (25) is primarily used as an index counter for repeating single microinstructions or repeating subroutines. This repeat feature is particularly useful for performing multiple shift, multiply, and divide machine instructions. To perform a repeat sequence, the repeat count is first loaded into R1 from the NA inputs with an RSR instruction which sets the RS flip-flop as shown in the above list of instructions. Each time the selected microinstruction or subroutine is executed, R1 is automatically incremented. When R1 is not equal to all 1's, R0 can not be incremented when it is pushed to the stack. On the last loop R0 is incremented and the return is normal.

A second function performed by R1 is a control memory address save function. When S6 is set to zero the contents of R0 are transferred directly to R1 on each clock. In this mode of operation it is intended to be a re-try register. If an error is detected in the present instruction, the processor could go back to the last "good" instruction which is temporarily stored in R1. It acts as a push down stack that is one register deep. When read (popped) the contents are not altered. It can be read with lines $S_7$, $S_8$ and $S_9$ or it can be popped to R0 with an RPI microinstruction. An additional mode of operation is as a subroutine stack that is one register deep. On a JLA, R0 is pushed to R1 through the incrementer and R0 is loaded with the jump address $NA_i$. RPI returns R1 to R0 under a mask of the NA bits. This allows a return to the original address in R0, the original address plus one, or one of these modified by the mask. Normal subroutining using the stack allows only the first two operations.

The length of R1 is extended with the $\overline{XB}$ line. For example, in a system that uses two control chips to address control memory a subroutine could be repeated up to 256 times—R1 is eight bits long. JSR is used to jump to a subroutine and RTN is used to return to the JSR location. The BSR and ROC instructions are not affected and may be used to nest subroutinges within the subroutine being repeated. A single instruction may also be repeated with the RPI instruction. R1 is incremented on each clock and R0 is not changed until there are all ones in R1. On the last count the microprogram jumps to a new location defined by the NA field.

R2-Instruction Register

Register R2 is used primarily as an instruction or operation code storage register. After a machine instruction, or macroinstruction, is fetched from the main memory 10 of FIG. 1, the control memory starting address is stored in R2. The contents of R2 can then be used by transferring the contents of R2 through the next address logic to the control memory address register R0. As with register R1, the operation of R2 is controlled by the instruction inputs I0 through I3 and the next address logic 20. The I Bus or input bus is the source for R2 and is loaded on either a JIN or JL2 instruction as in the table above. Information is transferred from R2 to R0 on a JPI (jump to primary) instruction or can be selected to O Bus or I Bus by S7, S8, and S9.

R2 is not limited, in this preferred embodiment, to use as an instruction register but can be used at any time it is desirable to store a control memory address location for later use. For example, R2 can store an interrupt vector which may be loaded into R0 as needed upon occurrence of the appropriate interrupt.

R3-Status Register

Register R3 is normally used as a status register for storing flag conditions. R3, like the other registers, is a four-bit register which can be loaded in parallel from either the NA or I Bus inputs. In addition, any single R3 bit can be set or cleared from the $D_{IN}$ input. The R3 outputs are continuously available at the R3 output data port, and the status information contained therein may be used in conjunction with other external information for generating branch conditions.

Any single R3 bit can be selected by S1 and S2 to be set or cleared by $D_{IN}$ or gated onto the $\overline{XB}$ extender bus line. $\overline{XB}$ goes to the next address logic 20 to control branch decisions. When the device of the instant invention is used as a slice processor in a larger machine, the $\overline{XB}$ line is common to every part. Therefore, branch decisions can be made independently of which microprogram control device contains the selected status bit. This operation will be described later in the specification. The operation of R3 with respect to the I Bus, NA inputs, $D_{IN}$ and $\overline{XB}$ is controlled by select lines S1, S2, S3 and S4.

Register R3 may further be used to extend the control memory address. This may be accomplished by organizing the control memory in a word-page format. The word address may be contained in R0 and the page address in R3. This, effectively, doubles the addressing capability of a single microprogram control chip. As will be later discussed, with two or more microprogram control chips operating in a slice processor mode, each page may be 256 words (8 R0 bits) and 16 pages may be addressed with four R3 bits or 256 pages using all eight R3 bit of the two microprogram control devices.

A still further use for R3 register is for storing all or part of the instruction operation code. In this manner, individual operation code bits could be selected onto the extender bus, ($\overline{XB}$) line and tested for secondary decode decisions.

R4-R7-Lifo Stack

Registers R4-R7 are arranged as a last-in-first-out (LIFO) stack for subroutine nesting within microprograms. When a jump to a subroutine is made, the return destination is automatically pushed onto the top of the LIFO stack, register R4, via incrementer 30, wherein it is incremented or not as a function of the state of $\overline{XB}$ as shown in Table 2. When returning from a subroutine, register R4 is loaded into the control memory address register R0 via next address logic 20.

With the four provided registers, it is possible to nest subroutines up to four deep within the LIFO. If additional stack depth is required, R1 can be used as a fifth location or R7 can be expanded to any length through the I Bus or φ Bus ports to additional circuitry off the chip, which may include additional microprogram control devices or additional RAM memory which may be included as a part of the overall system.

Register R7 may be read by means of the I Bus or φ Bus, via a series of two multiplexers 27 and 29 and a gate 31, as shown, during a push of the LIFO stack to provide a means for testing whether the stack is full. Logical "0" bits are normally loaded into the bottom of the stack through multiplexer 33 on a "pop", or read operation, from the top of the stack R4. Therefore, the presence of any non-zero information in R7 would indicate that the stack is full.

Push and pop stack operations are controlled by the I0-I3 input and the next address logic 20. In addition, select lines S7, S8 and S9 route information to and from the LIFO stack via the I Bus and φ Bus ports.

$\overline{XB}$ - Extender Bus

The extender bus is used to make a multiple chip control memory function operate as a single unit with a minimum of interfacing. When subroutines are being repeated it is used on the JSR, RTN and RPI instructions to test R1 for all bits equal to one. When all are equal to one, the $\overline{XB}$ line goes to one and allows R0 to be incremented on JSR and resets the RS flip-flop on RTN and RPI. Also on RPI it loads R0 with the jump address on NA. At all other times a single bit of R3 from each control function chip can be selected to this bus. During the BRC, BSR and R0C instruction the B input is selected to $\overline{XB}$ if $S_5$ is equal to zero. This allows a branch on the selected R3 bit(s) equal to one or any of the B inputs equal to one. Branch conditions are OR'ed together from each control function chip. For a BRM the B input is disabled from $\overline{XB}$. This allows a four-way jump with one chip ($\overline{XB}$ and B), an eight-way jump with two chips ($\overline{XB}$ and both B's) or a sixteen-way jump with three chips ($\overline{XB}$ and three B inputs). This instruction allows a jump to the appropriate subroutine depending on the priority of an interrupt.

Incrementer

A four-bit incrementer 30 is used in several of the microprogram control instructions as set forth in the preceding table. One of the instructions, the INC (increment command) linearly steps through a microprogram. A second function of the incrementer is to increment register R1 when it is used as an index counter for repeating microinstructions or subroutines as described in the preceding section with respect to register R1. The incrementer 30 is also used with the JSR (jump to subroutine), BSR (branch to subroutine), and JLA (jump and load address) commands to generate proper return addresses. Operation of the incrementer 30 is controlled by the I0 through I3 code and the $C_{IN}$ input, which is a carry-in command line.

The incrementer 30 may be expanded with the carry-in ($C_{IN}$) and carry-out ($C_{OUT}$) terminals when the microprogram control device is operated in parallel with other devices. The carry-out is connected directly to the carry-in of the like circuit handling the next most significant control memory address bits. Carry-out of the most significant bit is not required for count operation, but it can be used to signify maximum count value at the incrementer inputs.

Carry-in to the least significant microprogram control device is connected to a logic "1" for the increment operation. This output is normally hard-wired, but in some applications may be system-controlled to override the incrementer.

RSR Logic and RSR Flip-Flop

When repeat instruction or repeat subroutine instructions are to be utilized, a repeat subroutine flip-flop (RSR) 32 is provided with associated logic 34 to provide a means for setting the microprogram control device in an instruction repeat sequence as previously described. The RSR flip-flop 32 is automatically set when a repeat constant is loaded into register R1 with an RSR (repeat subroutine) instruction. It is cleared when register R1 reaches the final repeat count. By monitoring the RSR flip-flop status, the microprogram control device can make a logical decision as to when to perform microinstruction repeats. Additional details of the RSR flip-flop operation will be explained in a following functional description section.

Timing

All registers in the microprogram control device are composed of master-slave flip-flops and must be clocked to change stored data. A common clock is routed directly to all eight registers in the microprogram control device. In a preferred embodiment utilizing MECL flip-flops, the registers are clocked on the positive going clock edge ($V_{OL}$ to $V_{OH}$). At that time data present on the register inputs is stored in the register and is available at the register outputs. Signals on the register inputs can change at any time, with the clock at either logic state, and not change the register outputs. The only restriction on changing register inputs is during the clock set up and hold time near the positive going clock edge.

RST-Reset

The reset line operates in conjunction with the clock as a synchronous reset to reset all the registers of the device. R0-R3 are reset on a first clock pulse and the stacked contents sequentially on subsequent clocks beginning with R4 and ending with R7.

Functional Description

The following sections will describe the operation of the microprogram control device of the instant invention with respect to each of the instructions derived from the instruction control inputs I0-I3 and nine select lines S1-S9 which control the flow of data within the microprogram control device. Table 2 (Appendix) lists each of the sixteen microprogram control device instructions which are executed by the device in response to the control inputs. The table further describes the instructions and shows the associated mnemonics, binary select codes, and register transfers. Several instructions require making decisions on the status of the branch (B), extender bus (XB), RSR flip-flop output (RSQ), or select line S5. Both decision alternatives are given for the branch type instructions. Note: All logic diagrams and truth tables are expressed in negative logic.

INC-Increment

The increment command routes the present contents of R0 through the incrementer, adds $C_{IN}$, and multiplexes the result (R0+$C_{IN}$) to the R0 register inputs. As with all control instructions, the new address is loaded on a positive clock transition. This instruction is used to linearly step through the microprogram memory. When a plurality of microprogram control devices are operated in parallel, $C_{IN}$ of a more significant device is connected to $C_{OUT}$ of the previous microprogram control device. The least significant $C_{IN}$ is normally left floating at a logical "1".

JMP-Jump to Next Address

The JMP command provides for an unconditional jump to another control memory address. The jump destination is directly supplied on the NA inputs to the next address logic 20, which normally feedbacks from control memory. A clock transition transfers address data from the NA inputs to register R0.

JIB-Jump to I Bus

The JIB instruction is a direct jump to address information on the I Bus port. The I Bus is normally an internal data bus in the processor and can be used to input the starting address of the microprogram instruction routine. The I Bus data is modified or "masked" with control memory feedback on the NA inputs. The next address is therefore determined by the I Bus ANDed with NA inputs.

JIN-Jump to I Bus and Load R2

The JIN command routes the I Bus ANDed with NA input to R0 as does JIB. In addition, JIN loads unmodified I Bus data into register R2 on the same clock. This information in R2 can be used at a later point in the microprogram for primary and secondary program flow modification.

JPI-Jump to Primary Instruction

The JPI command is a jump to the contents of R2 ANDed with the NA inputs. Register R2 is loaded with a previous JIN or JL2 instruction. The code stored in R2 is used to start a new sequence of microinstructions or modify the present microinstruction sequence.

JEP-Jump to External Port

The JEP instruction is a direct jump to information on the O Bus port. The O Bus data is ANDed with the NA input (O Bus. NA) prior to entering register R0. The instruction offers an additional port to enter a starting address or modifying information to microprogram flow.

JL2-Jump to NA Inputs and Load R2

The JL2 command is a direct jump to the NA inputs and a parallel load of R2 from the I Bus. This instruction allows R2 to be loaded during the execution of another microinstruction. This is useful for storing an interrupt vector or a new operation address while finishing a previous microinstruction sequence.

JLA-Jump to NA Inputs and Load R1

The JLA command is a direct jump to the NA inputs and a parallel load of register 1. R1 is loaded with the incremented value of RO (RO+$C_{IN}$). The JLA instruction can be used to service an interrupt or as an additional form of subroutining.

JSR-Jump to Subroutine

The JSR instruction is an unconditional jump to a subroutine. The jump address is provided by the NA inputs which are loaded into register RO. At the same time, the present RO address is routed through the incrementer and "pushed" onto the LIFO stack to R4.

The JSR command operates in two modes depending upon the status of the RSR flip-flop as shown in Table 2. In FIG. 2, the RSR output is shown at Q associated with flip-flop 32.

1. Non-repeat mode is used for normal subroutining. The RSR flip-flop is clear (RSQ=0) which causes the present RO address to be incremented and pushed onto the stack. That is, RO+$C_{IN}$→R4 and the contents in registers R4-R7 are "pushed down" one location. Upon a return from subroutine the incremented address puts the control into the main program flow one location below the JSR address.

2. Repeat mode is used for multiple executions of the single subroutine. The RSR flip-flop has previously been set (RSQ=1) by an RSR instruction.

When RSR is set, the incrementer is disabled and RO is loaded into R4, the top of the LIFO stack. The stack registers R4-R7 are pushed down as previously described. Upon a return from subroutine, the original JSR address is returned to RO and the JSR is executed again. This repeat cycle will continue until $\overline{XB}$ signifies the final repeat count has been reached. The $\overline{XB}$ signal and the extender bus related thereto will be discussed in more detail at a later point in this description.

For multiple microprogram control device configurations, the $\overline{XB}$ line is a common connecion between parallel circuits. The RSR flip-flop signifies the repeat mode, and $\overline{XB}$ combines with R1 registers to determine the final repeat count. During A JSR instruction the incrementer is controlled by the following equation:

INTERNAL CARRY
IN=$C_{IN}$[$\overline{RSQ}$+(R13·R12·R11·R10)·$\overline{XB}$]

Additional information on the $\overline{XB}$ is found in the following Branch Control section.

RTN-Return From Subroutine

The RTN is an unconditioned return from subroutine in which the LIFO stack is "popped" and the contents of R4 are transferred to RO. Up to four levels of nesting are possible with this stack. As previously discussed, the stack can be extended by means of an output to the I Bus to parallel chips or additional storage.

The RTN instruction is used with the JSR for normal subroutining or multiple executions, again dependent upon the state of the RSR flip-flop.

1. If RSQ equals zero, a normal return is executed. The stack is "popped" and the contents of R4 are loaded into RO.

2. If RSQ equals one, the stack is "popped" to RO and R1 is incremented. The RTN will continue in the repeat mode until R1 is filled with all ones. The RSR flip-flop is reset when all R1 registers reach full count. As with the JSR command $\overline{XB}$ interconnects parallel microprogram control devices to determine the full count.

RSR-Repeat Subroutine

The RSR command initializes the RSR flip-flop and R1 for repeating microinstructions or subroutines. During the RSR, RO is incremented to the following control memory address (RO+$C_{IN}$→RO), R1 is loaded from the NA inputs and the RS flip-flop is set to a logical "1".

Register R1 determines the number of times a microinstruction or subroutine will be repeated. Used as a cycle counter, R1 is incremented until the register contains all ones (final count). For this reason, the repeat count originally loaded into R1 must be the 2's complement of the desired count number.

Setting the RSR flip-flop to a logical "1" causes JSR and RTN to repeat subroutines and RPI to repeat single microinstructions.

RPI-Repeat Instruction

The RPI command is used to repeat single microinstructions. In a repeat mode (RSR flip-flop set to logic "1" by an RSR instruction), RPI holds the RO control memory address constant and increments the R1 repeat counter. At the final repeat count, all "1's" in R1, the RSR flip-flop is reset to logic "0" and RPI loads the contents of R1 ANDed with the NA inputs into RO.

The RPI therefore directly jumps to the new address on the NA inputs after the microinstruction repeat sequence is complete (It should be noted that R1 remains at all "one's" after completing the repeat sequence).

$\overline{XB}$, again, is common to all parallel microprogram control devices to insure that R1 is full (all "1's") on all chips.

When not in a repeat mode (RSR flip-flop at logical "0"), the RPI instruction becomes a direct jump to register R1. R1 is ANDed with the NA inputs and loaded into RO. In this mode RPI is used with JLA for a single-level subroutine, where the return is: starting address plus 1, ANDed with NA.

BRC-Branch on Condition

The BRC instruction is a conditional jump to the NA inputs. The branch decision is determined by the equation:

BRANCH=$\overline{XB}$·(S5+B)

where $\overline{XB}$ is the external bus common to all parallel circuitry and B is the branch input to any memory control device. If the branch equation equals "0", BRC executes a direct jump to NA inputs. If the branch equation equals a logic "1", the present control memory address in RO is incremented (RO+CIN→RO) and the program goes to the next sequential location.

Normally the test bit is applied to a memory control device branch, B, input. For multiple chip configurations, the $\overline{XB}$ line is connected common so all microprogram control devices respond to the same branch signal. Select line S5 is an enable for the B input and selects which memory control device B input is tested for the branch decision. A selected R3 bit may also be used for branching as described in Table 3. (See Appendix)

BSR - Branch to Subroutine

The BSR is a conditional jump to subroutine. The branch condition is determined by the $\overline{XB}$ line and the B input as with BRC. If $\overline{XB}$·(S5+$\overline{B}$)=logic "0" the BSR jumps to subroutine. The subroutine destination on the NA inputs is loaded into R0, and the present address in R0 is incremented and pushed into the LIFO stack (R0+CIN→R4). If the branch equation equals logic "1", the present control memory address is incremented (R0+CIN→R0).

Unlike JSR, the BSR command is unaffected by the RSR flip flop status. Therefore, a BSR subroutine can be nested within a JSR/RTN repeat subroutine sequence without incrementing the R1 cycle count register. A ROC is then used to return from the BSR jump.

ROC - Return on Condition

The ROC is a conditional return from subroutine. If the branch equation $\overline{XB}\cdot(S5+B)=0$, the return is executed by popping the LIFO stack and loading R4 into R0. If the equation equals a logic "1", the memory control device performs a direct jump in the subroutine by loading the NA inputs into R0. ROC operates independently of the RSR flip flop and can be used with BSR to nest subroutines within a repeat sequence.

BRM - Branch and Modify

The BRM instruction is a jump to the NA inputs with an address modification by the B and XB inputs. The following information is loaded into R0 with R03 being the most significant bit in the part.
R03=NA3
R03=NA2
R01=NA1·$\overline{XB}$
R00=NA0·B Note that XB is inverted as a modifier. This address modification allows multiway branching where the branches are sequential locations.

S5 overrides the branch modifiers as shown in Table 2. When multiple memory control devices are operated in parallel, S5 can be used to disable B and XB on all but the two least significant address bits.

Repeat and Branch Control B, XB, S5

The Branch (B), Extender Bus (XB) and Select line S5 control certain memory control device instructions to make repeat or conditional jump decisions.

Branch-B and Select Line - S5

Branch operations BRC, BSR, and ROC use the B input as a source of decision information. Parallel memory control device circuits determine the branch status from any B input enabled by select line S5. The selected B input is routed to the XB line which is common to all memory address control devices and allows parallel circuits to operate as a unit.

A branch decision depends on the following equation: BRANCH=$\overline{XB}\cdot(S5+B)$. Select line S5 enables the B input when held at a negative logic "0" (MECL $V_{OH}$). A branch then occurs if B=logic "1", and the XB line extends this branch condition to all parallel circuits. $\overline{XB}$ is a complemented signal to operate properly when wired together using the negative logic AND function.

The BRM instruction is a special type of branch where the B and XB lines determine register R0 bits as follows:
R03=NA3
R02=NA2
R01=Na1·$\overline{XB}$
R00=NA0·B Select line CS4 overrides this use of the branch inputs. The above R0 inputs are maintained with S5=logic "0" and the four NA inputs are routed directly to R0 when S5=logic "1". This feature is used with parallel memory control device circuits to perform a 4-way branch with the two least significant address bits. S5 disables the branch on the more significant circuits. If two microprogram control devices are used with S5="0" on both chips, 8 way branching is possible with the next microprogram address being NA7, NA6, NA-5·$\overline{XB}$, NA4·B2, NA3, NA2, NA1·$\overline{XB}$, NA0·B1, where B1 is the branch input on the lower order chip and B2 is the branch input on the upper order chip.

Repeat operations JSR, RTN, and RPI respond to $\overline{XB}$, but not to B. The functional equation for a repeat decision is $\overline{RSQ}+RIN\cdot\overline{XB}$ requiring a combination of repeat mode on the RSR flip flop, repeat cycle count information RIN, and the $\overline{XB}$ line to interconnect parallel microprogram control devices. Repeat operation is discussed in the preceeding instruction descriptions.

Extender Bus - XB

The $\overline{XB}$ line operates in several modes and can be driven from various parts of the memory control device or from external circuitry.

The $\overline{XB}$ line is controlled by the B input to insure branch coupling between parallel circuits as described above. Status register R3 bits can be multiplexed onto $\overline{XB}$ with select lines S1 through S4. To make branch decisions, the selected R3 bit goes to all parallel microprogram control devices on the $\overline{XB}$ interconnection. Select lines S1 through S4 operate independently of the selected memory control device I0-I3 control instruction and must be programmed for the branch.

Repeat register R1 and the RSR flip flop control $\overline{XB}$ during a JSR, RTN, or RPI instruction. If RSQ=logic "1" (repeat mode) and R1 signifies a repeat count, $\overline{XB}$ is forced to a logic "0". $\overline{XB}$ going to all parallel microprogram control device circuits, couples the cycle count information in R1 to control the repeat sequence. During a repeat sequence R3 status bits should be disabled from $\overline{XB}$ to avoid overriding the R1 cycle count. In a nonrepeat mode, RSQ=logic "0", the $\overline{XB}$ line has no affect on JSR, RTN or RPI instructions.

It is possible to control or modify the $\overline{XB}$ line from an external signal. The $\overline{XB}$ pins of parallel microprogram control devices are emitter dotted and an external signal can be tied into this connection. The external signal would override internal microprogram control device control by forcing a negative logic "0" (MECL $V_{OH}$) on the $\overline{XB}$ line. This feature is not required for normal microprogram control device operation and would be used to produce special branch functions.

Table 4 is a listing of the $\overline{XB}$ status as controlled by the various microprogram control device control sequence instructions and select lines S1, S2, S4 and S5. (See Appendix for Table 4)

Status Register R3 Control S1, S2, S3, S4

Register R3 is primarily used as a storage area for microprogram status information. The contents of this register are continuously available. Information can be loaded from the I Bus port, NA inputs, or from the single line input DIN. Select lines S1 through S4 and the reset, $\overline{RST}$, input control all R3 load operations. In addition, S1, S2, and S4 enable R3 bits onto the $\overline{XB}$ line as described in the preceeding section and Table 4.

S1 and S2 select one of the four R3 bits to be loaded from information on the DIN input. This occurs with S2=logic "0". S1 and S2 also select the I Bus or NA inputs for parallel loading R3. Table 3 shows the truth table for entering information into R3. As with all device registers, R3 is a master-slave design which loads information on a positive going ($V_{OL}$ to $V_{OH}$) clock edge.

Instruction Retry - S6

The R1 register can also be used as a retry register by using S6=0 to cause R0 to be pushed to R1 (see Table 5). This means that R1 stores the previous microinstruction. If an error is detected in the control caused by the $\mu$ instruction the $\mu$ instruction that caused the error is stored in R1 and can be repeated using the RPI instruction to load R0 with the contents of R1.

Bus Control S7, S8, S9

The I Bus and $\phi$ Bus function as I/O ports for information stored within the device internal registers. For data output, S7, S8, and S9 select the proper register and enable the bus output drivers. When not used to output data the internal bus drivers are forced to a negative logic "1" (MECL $V_{OL}$) to provide for I Bus and $\phi$ Bus data input operations.

Lines S7, S8, and S9 select data from registers R1, R2, or either end of the LIFO stack R4 and R7. S6 selects either the I bus or the $\phi$ Bus while S8 and S9 control the source of output data. Registers R1 and R2 are directly selected. However, R4 and R7 selection is dependent upon I0–I3 control instructions involving the LIFO. R7 can be read only during a JSR or BSR with branch LIFO push operation. Reset, $\overline{RST}$, results in a LIFO push and also enables R7 as an output.

LIFO pop operations, as caused by a RTN or ROC with branch, forces a logic "1" state on the I Bus and $\phi$ Bus drivers. Either port can then input information to R7 as required to extend the stack depth with external circuits. All control instructions not involving the LIFO enable R4 as a possible I Bus or $\phi$ Bus data source. Table 6 shows registers available to the I Bus and $\phi$ Bus as output ports. (See Appendix for Table 6)

The bus control inputs also select either the I Bus or $\phi$ Bus as input ports to load information into the bottom of the LIFO (R7). Select line S7 selects either the I Bus or $\phi$ Bus while S8 and S9 in conjunction with a LIFO pop function, RTN or ROC with branch, enables these ports as inputs to R7. Table 7 shows complete LIFO operation and selection of I Bus and $\phi$ Bus as controlled by the IC0–IC3 control instructions and the S7–S9 bus control inputs.

The I Bus automatically becomes an input port to R0 or R2 during a JIB, JIN, or JL2 instruction. When using these instructions a logic "1" is normally selected on the I Bus drivers, see Table 6, to avoid a conflict between internal register data and the incoming I Bus information. (See Appendix for Table 7)

Carry Out $C_{OUT}/$

The $C_{out}$ line is a direct function of the $C_{in}$ input and the R1 of R0 registers as shown in Table 8. The $C_{out}$ line of the most significant device can be used to detect when R0 or R1 contain all 1's. (See Appendix for Table 8)

While the logical operation of the Extender bus has been primarily described thus far with respect to its operation in controlling Repeat Instruction (RPI) subroutining (JSR, RTN) and branching (BRC, BSR, ROC), the Extender bus is particularly useful in systems in which a plurality of program control devices are used in parallel, such as in use as a part of slice processor system of n-slices.

In the slice, multi-chip environment the $\overline{XB}$ provides a means for tying together the multiple chip microprogram control devices to allow operation as a single device with a minimum of interfacing when branching and repeating subroutines.

Figure 3:
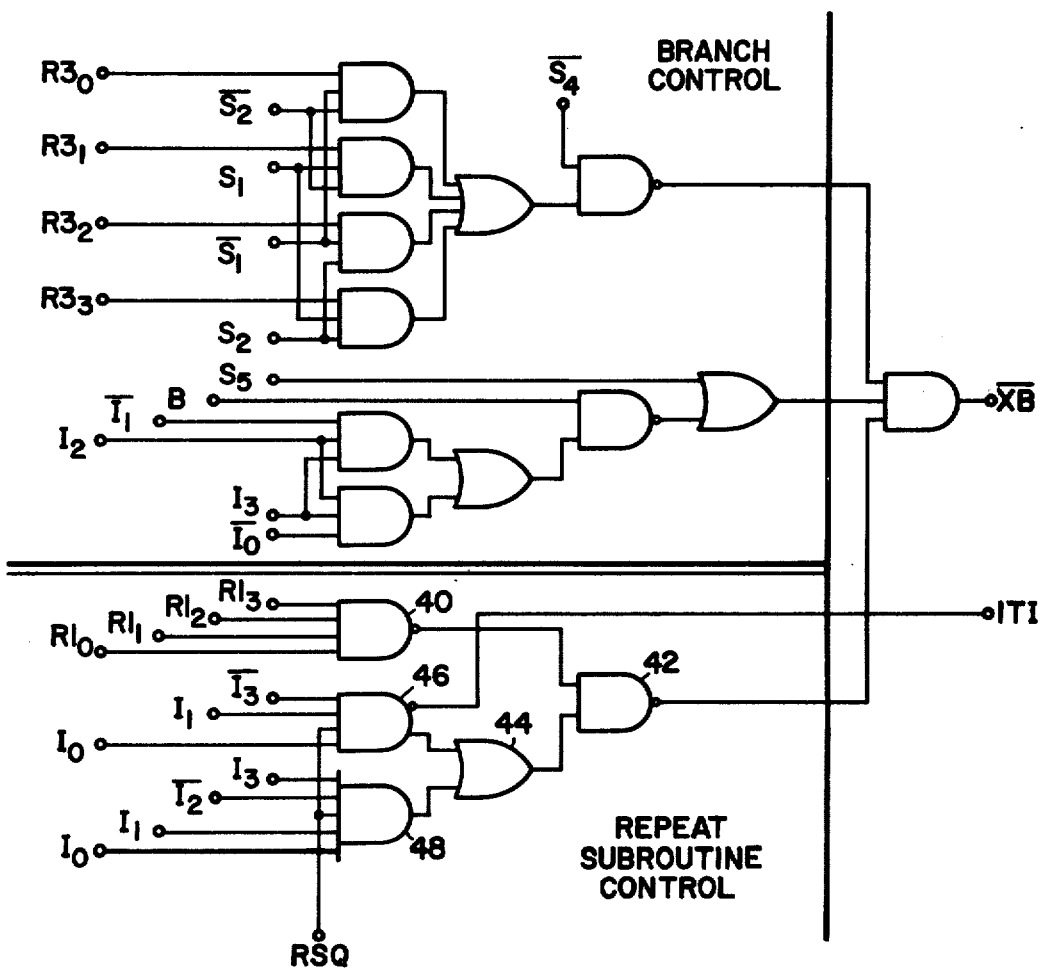
FIG. 3 is a schematic diagram of the logic used to generate, in branch and repeat modes, the extender bus signal.

FIG. 3 is a logic block diagram of the logic associated with the Extender Bus, which logic is used to generate the $\overline{XB}$ function.

To generate $\overline{XB}$ during Repeat Subroutine operations, inputs from R1, I0–I3, and RSQ are required. When all bits of register R1 are at the "1" state, the output of gate 40 goes to "0". Thus, applying a "0" input to one terminal of NAND gate 42 produces a high output from the gate.

Similarly, for the Branch Control $\overline{XB}$ generation, the required inputs to set $\overline{XB}$ are $I_0$–$I_3$, B, $R3_0$–$R3_3$, $S_1$, $S_2$, $S_4$ and $S_5$.

Figure 4:
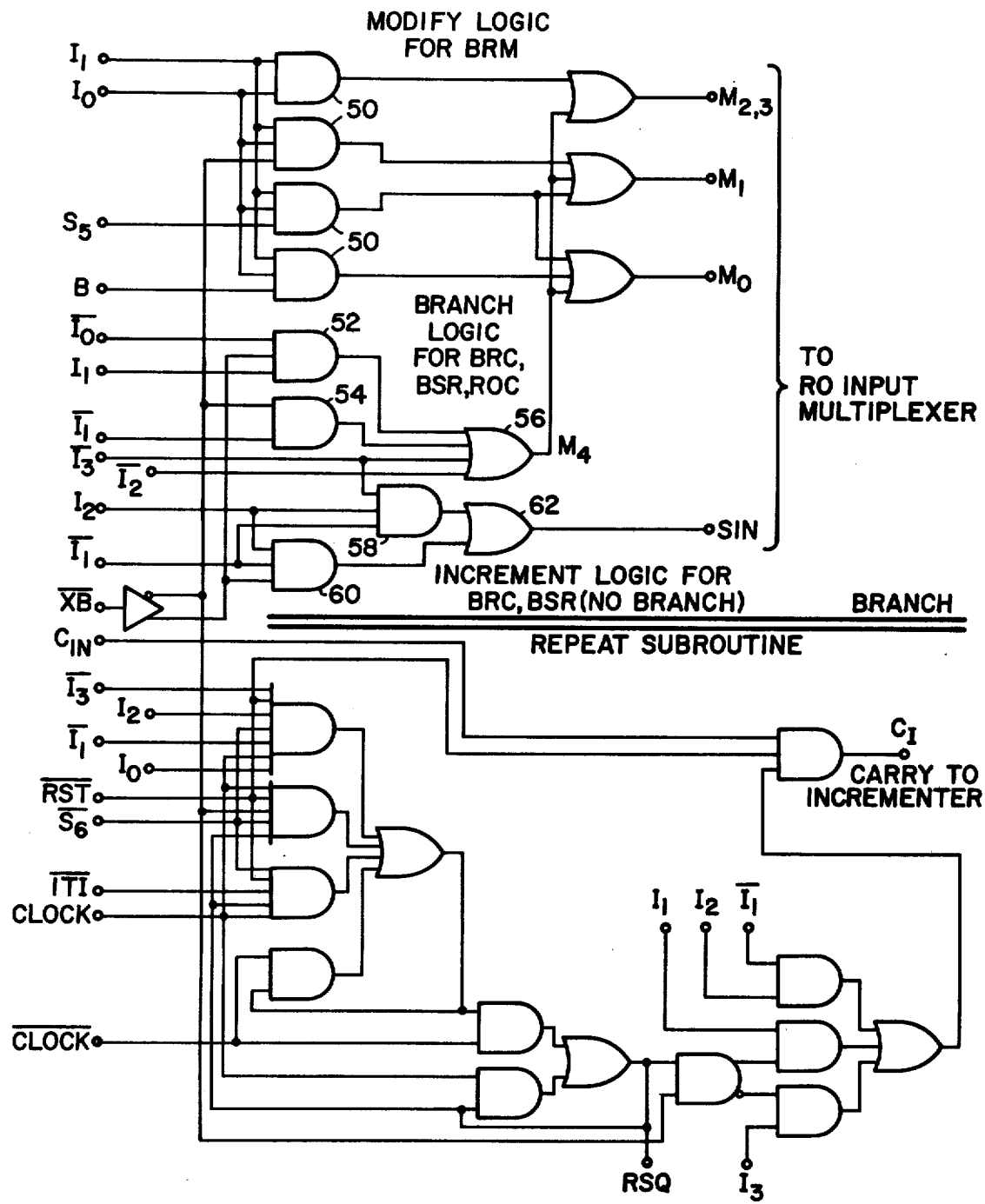
FIG. 4 is a schematic diagram of the logic used in conjunction with the extender bus signal $\overline{XB}$ to generate control signals to perform various branching or repeat operations within the microprogram control device.

FIG. 4 shows the logic associated with the presence of $\overline{XB}$ for performing the functions related thereto. The appropriate logic and input signals are shown for both Repeat Subroutine and Branch operations. The series of AND gates 50 produce the Modify logic for a Branch and Modify instruction, gates 52, 54 and 56 provide the Branch logic for Branch on Condition, Branch to Subroutine and Return on Condition instructions, and gates 58, 60 and 62 provide the selection of the Incrementer 30 to register R0. The remainder of the logic relates to the Repeat Subroutine with its Carry-in to the Incrementer 30.

Figure 5:
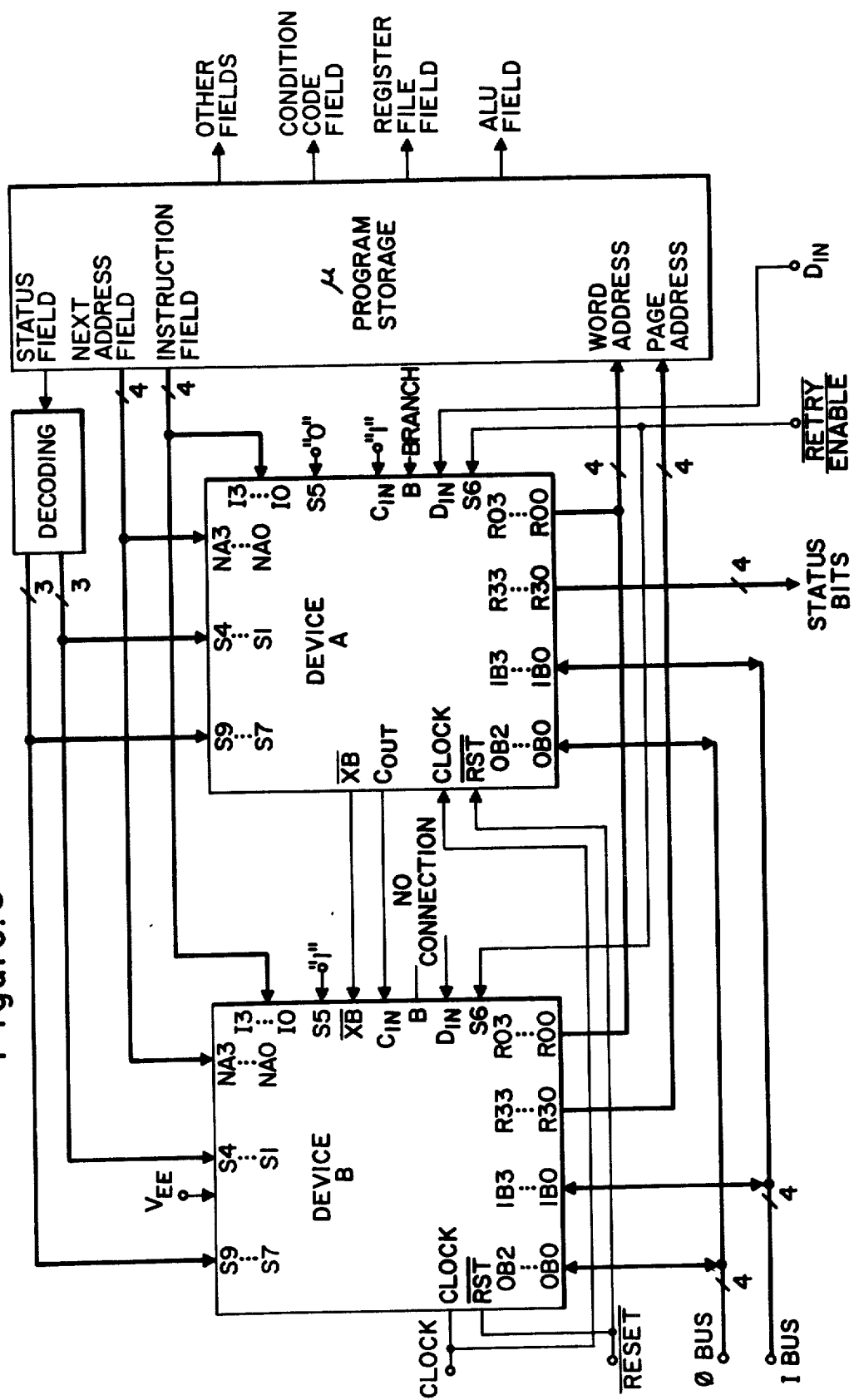
FIG. 5 is a block diagram showing the interconnection of two memory address control devices as used to implement an 8-bit function from two 4-bit slice devices.

FIG. 5 is a block diagram showing the interconnections of two devices, A and B, as in a slice-processor.

Memory Addressing

Two microprogram Address Control Devices provide increment, direct jump, branch, and subroutine capability for up to 256 words of control memory. Three devices can extend this to 4K words. Control register R0 outputs are the control memory address.

A second technique to extend memory addressing beyond 256 words is by the use of two devices and word-page memory mapping. Status Register R3 of device B extends the memory size to 16 pages of 256 words each. Increment, direct jump, branch, and subrouting are restricted to within a given page, however, the third device and Next Address feedback bits from control storage are eliminated. The page address is loaded from the I Bus or NA inputs and controlled via the Status Field.

Control Storage

Control storage can be as large as 4K words (16 pages×256 words) for the example shown. If writable control storage is desired, MECL RAM's (MCM 10144 or MCM 10146) are used. For PROM, the MCM 10149 is used.

The word is the sum of the various control fields existing the control storage. The Instruction Field equals 4 bits, the Next Address Field equals 8 bits, the Status Field is up to 10 bits, etc. It is possible for the work size to be 60 or 80 bits or more including the RF, ALU, condition code, and other processor fields.

If system cycle times permit, the word size can be decreased by control field decoding. Small PROM's such as the 10139 or discrete logic may be used to decode the select line signals. The number of microprogram bits can be reduced but additional delay in the feedback path is introduced.

Microprocessor Sequence Control

The control field's feedback from storage to the Memory Address Control Devices determine the microprogram sequence. The 4-bit Instruction Field selects one of 16 control instructions to generate the next microprogram address. Instruction lines I0 through I3 are respectively tied in parallel so that devices A and B perform the same instruction.

The Next Address Field is 8 bits wide—four bits to the most significant device B and the other four bits to device A. The NA inputs are the source of constants, starting addresses, jump and branch vectors, subroutine vectors, and masking information. The data at the NA inputs is used by the device and controlled by the Instruction Field and/or the Status Field.

The Status Field can be up to 10 bits wide. The number of bits can be decreased with decoding or with selective functions.

Control lines S1 through S4 are driven independently because they manipulate register R3 on each device. Register R3 is the Page Address register on device B, and is a status bit register on device A. Each R3 register on the two chips must be controlled independently.

Other connections to the Memory Address Control Devices include:

1. $C_{IN}$ of the least significant device A is a logic "1" for increment functions. $C_{OUT}$ of device A ripples to $C_{IN}$ of devices B.

2. The $\overline{XB}$ lines are tied common for parallel branch functions.

3. Branch information is tested on the B input of device A. As a result, S5=1 for device B to disable its branch input because the input is not used.

4. Clock and reset are tied in parallel on both devices.

5. S6 is the R0 output disable or the Word Address Disable. This line can be used for writable control storage functions or interrupt functions.

6. Data can be entered into R3 register on a single bit basis using the $D_{IN}$ input.

I Bus and φ Bus

The data buses are tied to other ports of the processor. Starting addresses, interrupt vectors, and extention of the internal LIFO stack are common uses of these buses. Both the I Bus and φ Bus are bidirectional, and are controlled by the Status Field and the Instruction Field.

Subroutine & Repeat Functions

Subroutine and repeat operations are important functions of the Memory Address Control Devices. Each is illustrated as follows:

1. Non-repeat subroutine—An example is illustrated in Table 9. The address is limited to the word address and is listed in hexadecimal. At address 06, a JSR is executed in which address 17→R0, the present address plus 1→R4, and the stack is pushed. The subroutine begins at address 17 and ends at address 19 with an RTN. When the RTN is executed, (R4)→R0, the stack is popped, and the program jumps to location 07 to continue the program.

2. Repeat subroutine—Table 10 shows this example. The instruction flow is similar to the above example except that an RSR must be executed. During the RSR, R1 is loaded with the 2's complement of 4 which is the number of times the subroutine is to be repeated. In hexadecimal notation, this is FC for 4 cycles. Also RSQ is set to 1 for repeat (in the non-repeat mode RSQ=0).

The JSR is executed to begin the subroutine operation. During the JSR, the subroutine address 17→R0, the present address 06 plus $C_{IN}$ internal→R4 and the stack is pushed. If RSQ=0 or R1=FF, $C_{IN}$ internal=1. Thus for the first 3 cycles when the JSR is executed, the present address 06 is loaded into R4.

At the end of each subroutine cycle, an RTN is executed or (R4)→R0; the stack is pushed; and if RSQ=1 and R1≠FF, then R1 is incremented and if R1=FF, 0→RSQ. In this example for the first 3 cycles, the RTN jumps to 06 (the JSR) and R1 is incremented finally to FF.

On the final cycle, the JSR is executed with R1=FF and address 07 is loaded into R4. Then, the RTN resets RSQ and jumps to location 07 to end the operation.

For this example with an 8-bit word address, the maximum number of subroutine cycles is 256.

3. Repeat Instruction is shown in Table 11. As in the repeat subroutine, an RSR is executed loading R1 with =FC and RSQ is set. This sets the number of instruction cycles at 4.

An RPI then is executed. If RSQ=1 and R1≠FF, then (R1) plus 1→R1 and R0→R0. If R1=FF, RSQ is reset and (11)·(FF)→R0.

Thus for the first 3 cycles, R1 is incremented and R0 stays at the present address. During the fourth and final cycle (R1=FF from the 3rd cycle) RSQ is reset and R0 jumps to the Next Address value (11) AND'ed with the value of R1 (FF) which is all logic "1's". The location 11 now continues the program.

The maximum repeat cycle is again 256.

Figure 6:
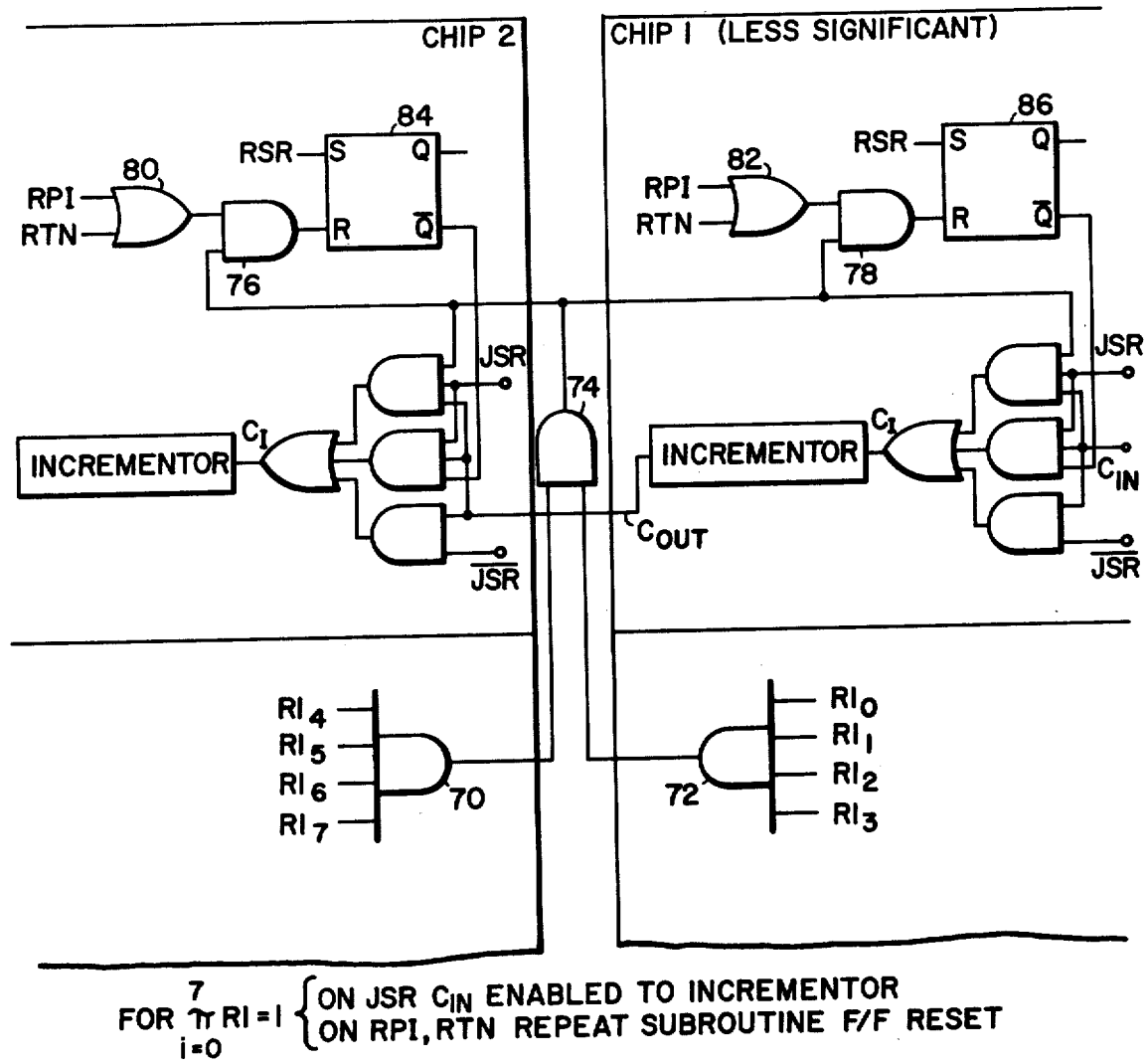
FIG. 6 is a schematic diagram of the logical equivalent of two microprogram control device functions for extender bus repeat instructions.

FIG. 6 is a schematic diagram representing the logical equivalent structure of the Extender Bus logic for RPI, RTN and JSR instructions as in a multi-chip slice processor environment.

As previously noted, the RPI instruction is used to repeat single microinstructions. An RSR instruction sets the RS flip-flop to logic "1" and the RPI instruction holds the R0 control memory address constant while incrementing the R1 register.

It will be recalled that R1 is loaded prior to an RPI instruction with the two's complement of the number of repetitions desired. Thus, as can be seen in FIG. 6, when R1 contains all ones, the desired number of repetitions has been completed and the AND gates 70 and 72 will go to a logic "1" state thus activating AND gate 74 to produce $\overline{XB}$. $\overline{XB}$ in turn triggers AND gates 76 and 78 together with the outputs from OR gates 80, 82, the outputs of which are asserted by the RPI instruction. AND gate 76 and 78 reset the RS flip-flops 84, 86 to allow the contents of R1 to be ANDed with the NA inputs and placed in R0 as the next control memory address. Since R1 was all ones, the next address is NA.

With the JSR instruction, which is an unconditional jump to a subroutine, the jump address is provided by NA which is loaded into R0. The present R0 contents are pushed to the stack.

The JSR instruction operates in two modes depending upon the status of the RS flip-flops 84, 86 in FIG. 6. For normal subroutining, the RS flip-flops are reset (RSQ=0) which allow the R0 contents to be incremented and pushed to the stack. Upon a return from a subroutine, the incremented R0 address resumes the original program flow.

In the subroutine repeat mode, the RS flip-flops are set by an RSR instruction, thus disabling the incrementer from incrementing R0 before R0 is pushed to the stack. Upon a return from subroutine the original JSR address is then returned to R0 and the JSR is executed again. This cycle repeats until $\overline{XB}$ resets the RSR flip-flops due to a concurrence of ones in the R1 register, similarly as with the RPI instruction. When $\overline{XB}$ resets the RS flip-flops, the JSR is executed one more time, but, since the RS flip-flops are reset the incfrementer is not inhibited and the contents of R0 are incremented before being pushed to the stack. The next return loads $R0+C_{IN}$ into R0 and the main program resumes execution.

For an RTN instruction, or Return from Subroutine, if the RS flip-flops are reset (RSQ=0) a normal return from R4 (top of stack) to R0 occurs. If, however, RSQ=1 the stack is popped to R0 and R1 is incremented. The RTN continues in the repeat mode until R1 is all "ones", at which time $\overline{XB}$ resets the RS flip-flops and a normal return from the stack is executed.

Figure 7:
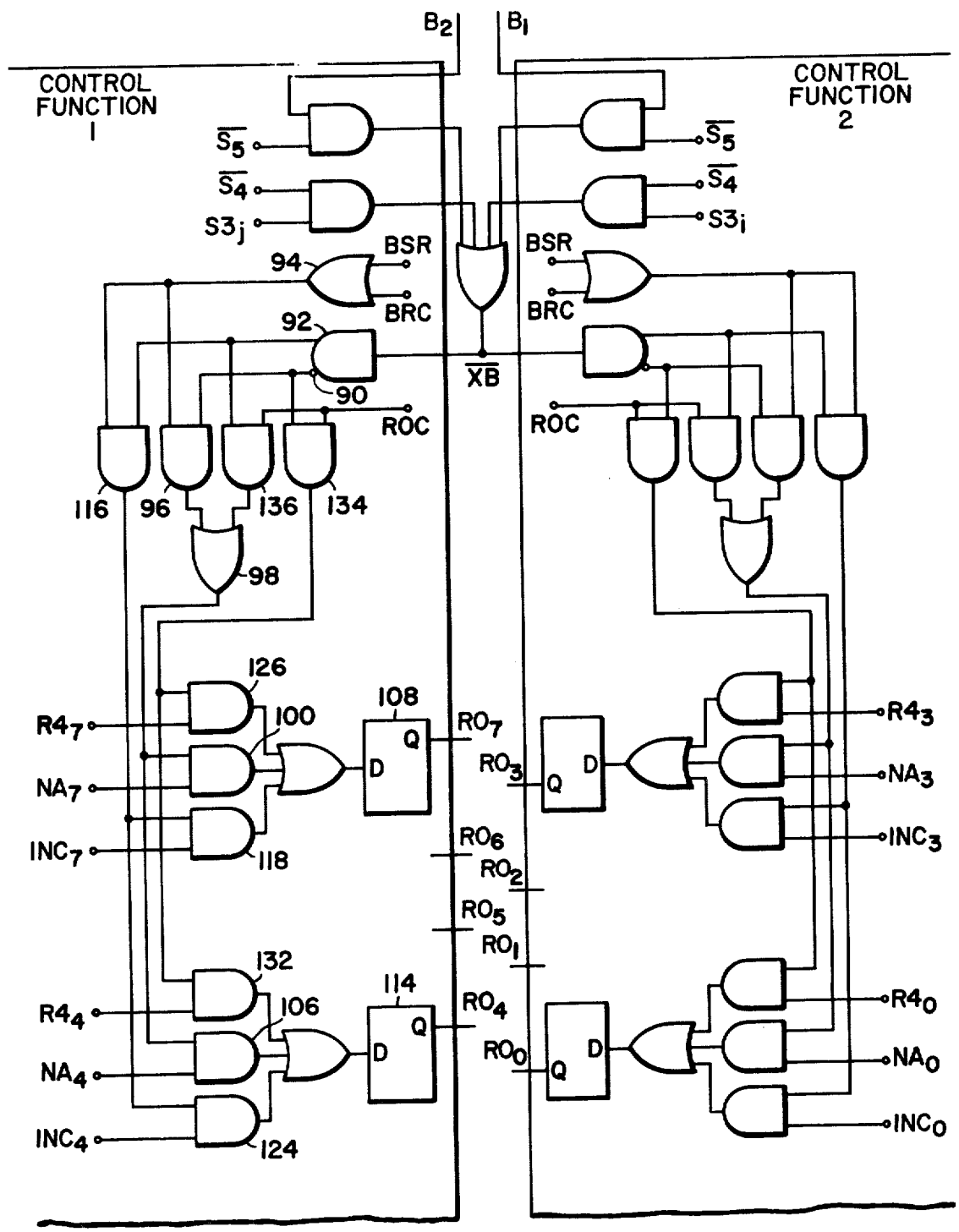
FIG. 7 is a schematic diagram of the logical equivalent of two microprogram control device functions for extender bus conditional jump and return instructions.

FIG. 7 is a schematic diagram representing the logical equivalent structure of the Extender Bus logic for BSR, BRC and ROC instructions as in a multi-chip slice processor device.

The BRC, Branch on Condition, instruction is a conditional jump to the NA inputs, as determined by Branch=$\overline{XB}\cdot(S5+B)$. If the branch equation is zero, BRC executes a direct jump to the NA inputs.

For example, if $\overline{XB}$ is a "0", the inverted output 90 of AND gate 92 is a "1", and due to the presence of a "1" output at OR gate 94 because of BRC, AND gate 96 goes to a "1", producing a "1" output at OR gate 98. OR gate 98 is connected as an input to AND gates 100...106 to gate the $NA_7...NA_4$ lines to register $RO_{7-4}$, 108...114. If $\overline{XB}$ is a "1", the presence of BRC at gate 94 turns on AND gate 116 which allows the incrementer to increment the presence control memory address in R0 via gates 118...124. In that case, the program proceeds to the next sequential address.

As shown in FIG. 7, $\overline{XB}$ is asserted by combinations of B, $S_5$, $S_4$ and specified R3 bits. For multiple chip configurations $\overline{XB}$ is an AND function connected common so that all memory address control devices respond to the same branch signal.

For a BSR instruction, which is a Conditional Branch to Subroutine, the branch condition is determined by $\overline{XB}$ and B according to the equation Branch=$\overline{XB}\cdot(S5+B)$. If Branch=0, the subroutine destination appearing on the NA inputs is loaded into R0 through gates 100...106 and the contents of R0 are incremented and pushed to the stack. If Branch=1, the present R0 is incremented through gates 118...124.

Since BSR is unaffected by the RS flip-flop, a BSR can be nested within a JSR/RTN repeat subroutine sequence without incrementing R1.

Return from BSR is made with an ROC, Return on Condition, instruction. If $\overline{XB}\cdot(S5+B)=0$, return is executed by popping the stack by way of AND gates 126...132 as allowed by gates 134 amd 92. If $\overline{XB}\cdot(S4+B)=1$ the memory address control device performs a direct jump by loading the NA inputs into R0 as allowed through AND gate 136, OR gate 98 and AND gates 100...106.

Figure 8:
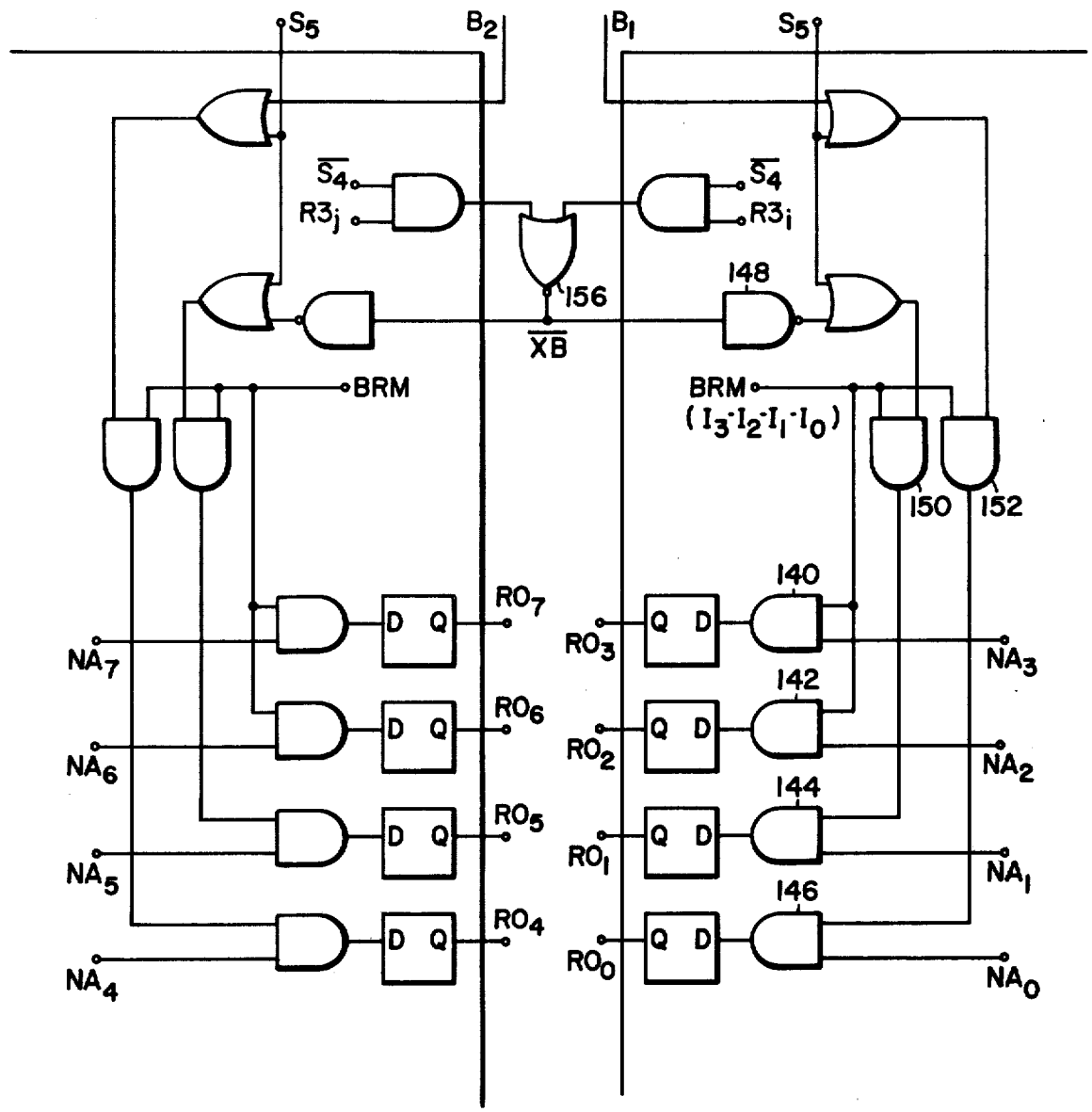
FIG. 8 is a schematic diagram of the logical equivalent of a Branch-and-Modify instruction for a microprogram control device.

FIG. 8 is a schematic diagram representing the logical equivalent of the Extender Bus logic for a BRM, Branch and Modify, instruction.

The BRM causes the $NA_3$, $NA_2$ inputs via AND gates 140, 142 and to $NA_1 \cdot \overline{XB}$ and $NA_0 \cdot B$ via AND gates 144, 146 to be loaded into R0. In this case $\overline{XB}$ is inverted by inverter 148 prior to being applied through AND gates 150, 152 to AND gates 144, 146. The branch modifiers $\overline{XB}$, and B may be overridden by S5 when a "1" through gates 154, 156 thus enabling $NA_1$ and $NA_0$ directly through gates 144, 146. A selected R3 bit can also be enabled onto the $\overline{XB}$ line when S4 is a "0".

With multiple devices as in FIG. 8, S5 can be used to disable B and $\overline{XB}$ on the two least significant address bits.

TABLE 1

| APPENDIX | |
|---|---|
| INC - | Increment |
| JMP - | Jump to N.A. Inputs |
| JIB - | Jump to I Bus |
| JIN - | Jump to I Bus and Load R2 |
| JPI - | Jump to Primary Instruction (R2) |
| JEP - | Jump to External Port (0 Bus) |
| JL2 - | Jump to N.A. Inputs and Load R2 |
| JLA - | Jump to N.A. Inputs and Load Address into R1 |
| JSR - | Jump to Subroutine |
| RTN - | Return from Subroutine |
| RSR - | Repeat Subroutine (Load R1 from N.A. Inputs) |
| RPI - | Repeat Instruction |
| BRC - | Branch to N.A. Inputs on Condition otherwise Increment |
| BSR - | Branch to Subroutine on Condition otherwise Increment |
| ROC - | Return from Subroutine on Condition otherwise Jump to N.A. Inputs |
| BRM - | Branch and Modify Address with Branch Inputs (Multiway Branch). |

TABLE 2

| MNEM | CODE | | | RESET RST | BRANCH OR REPEAT CONDITION[2] | REGISTER AND FLIP FLOP OUTPUTS [4] $V_{OL}$-$V_{OH}$ | | | | LIFO STACK | RSQ[3] |
| | 13 | 12 | 11 | 10 | DESCRIPTION | | R0 | R1[7] | R2 | R4-R7[6] | |
|---|---|---|---|---|---|---|---|---|---|---|---|
| X | X | X | X | X | RESET CONDITION | 0 | X | 0 | 0 | 0 | — | 0 |
| INC | 1 | — | — | — | INCREMENT | 1 | X | R0 plus $C_{in}$ | — | — | — | — |
| JMP | 0 | 0 | 0 | 0 | JUMP TO NEXT ADDRESS | 1 | X | NA | — | — | — | — |
| JIB | 1 | 0 | 0 | 1 | JUMP TO I BUS | 1 | X | IB · NA | — | — | — | — |
| JIN | 1 | 0 | 1 | 0 | JUMP TO I BUS & LOAD R2 | 1 | X | IB · NA | — | IB | — | — |
| JPI | 1 | 0 | 1 | 1 | JUMP TO PRIMARY INST. | 1 | X | R2 · NA | — | — | — | — |
| JEP | 1 | 1 | 0 | 0 | JUMP TO EXTERNAL PORT | 1 | X | φB · NA | — | IB | — | — |
| JL2 | 0 | 0 | 0 | 1 | JUMP & LOAD R2 | 1 | X | NA | — | — | — | — |
| JLA | 0 | 0 | 1 | 0 | JUMP & LOAD ADDRESS | 1 | X | NA | R0 plus $C_{in}$ | — | — | — |
| JSR | 0 | 0 | 1 | 1 | JUMP TO SUBROUTINE | 1 | X | NA | — | — | "PUSH" R0 TO STACK | — |
| RTN | 1 | 1 | 1 | 1 | RETURN FROM SUBROUTINE | 1 | $\overline{RSQ}$ + RIN · $\overline{XB}$ = 0 | NA | — | — | — | — |
| | | | | | | 1 | $\overline{RSQ}$ + RIN · $\overline{XB}$ = 1 | R4 | — | — | "PUSH" R0 plus $C_{in}$ TO STACK | — |
| RSR | 1 | 1 | 0 | 1 | REPEAT SUBROUTINE | 1 | $\overline{RSQ}$ + RIN · $\overline{XB}$ = 0 | R4 | R1 plus $C_{in}$ | — | "POP" STACK TO R0 | 0 |
| RPI | 1 | 1 | 1 | 0 | REPEAT INSTRUCTION | 1 | $\overline{RSQ}$ + RIN · $\overline{XB}$ = 1 | — | NA | — | "POP" STACK TO R0 | — |
| BRC | 0 | 1 | 0 | 1 | BRANCH ON CONDITION | 1 | X | R0 plus $C_{in}$ | — | — | — | 0 |
| | | | | | | 1 | $\overline{XB}$ · (CS4 + $\overline{B}$) = 0 | R1 · NA | — | — | — | — |
| | | | | | | 1 | $\overline{XB}$ · (CS4 + $\overline{B}$) = 1 | NA | — | — | — | — |
| BSR | 0 | 1 | 0 | 0 | BRANCH TO SUBROUTINE | 1 | $\overline{XB}$ · (CS4 + $\overline{B}$) = 0 | R0 plus $C_{in}$ | — | — | "PUSH" R0 plus $C_{in}$ TO STACK | — |
| | | | | | | 1 | $\overline{XB}$ · (CS4 + $\overline{B}$) = 1 | R0 plus $C_{in}$ | — | — | — | — |
| ROC | 0 | 1 | 1 | 1 | RETURN ON CONDITION | 1 | $\overline{XB}$ · (CS4 + $\overline{B}$) = 0 | R4 | — | — | — | — |
| | | | | | | 1 | $\overline{XB}$ · (CS4 + $\overline{B}$) = 1 | NA | — | — | "POP" STACK TO R0 | — |
| BRM | 0 | 1 | 1 | 0 | BRANCH & MODIFY | 1 | CS4 = 1 | NA | — | — | — | — |
| | | | | | | 1 | CS4 = 0 | R00 = NA0 · B | — | — | — | — |
| | | | | | | | | R01 = NA1 · XB | | | | |
| | | | | | | | | R02 = NA2 | | | | |
| | | | | | | | | R03 = NA3 | | | | |

NOTES:
[1] X = DON'T CARE STATE
— = NO CHANGE
[2] EQUATIONS APPLY AS SHOWN, WHERE:
RIN = (R13 · R12 · R11 · R10)
XB = EXTERNAL EXTENDED BRANCH NODE
$\overline{B}$ = COMPLEMENT OF BRANCH INPUT
[3] RSQ = OUTPUT OF RSR FLIP FLOP
[4] ALL REGISTERS AND RSR FLIP FLOPS CHANGE STATE ON $V_{OL}$ TO $V_{OH}$ (POSITIVE GOING) CLOCK TRANSITION
[5] NEGATIVE LOGIC USED THROUGHOUT
[6] TABLE 6 SHOWS LIFO STACK TRUTH TABLE
[7] IF S6 = 1, R1 IS AS SHOWN
IF S6 = 0, R0→R1 and 0→RSQ

TABLE 3

TRUTH TABLE FOR STATUS REGISTER R3 and $\overline{XB}$ AS A FUNCTION OF S1-S4

| SELECT LINE INPUTS | | | | | REGISTER R3 OUTPUTS | | | | |
|---|---|---|---|---|---|---|---|---|---|
| $\overline{RST}$ | S4 | S2 | S2 | S1 | R33 | R32 | R31 | R30 | $\overline{XB}$ |
| 0 | X | X | X | X | 0 | 0 | 0 | 0 | — |
| 1 | 0 | 0 | 0 | 0 | — | — | — | DIN | $\overline{R30}$ |
| 1 | 0 | 0 | 0 | 1 | — | — | DIN | — | $\overline{R31}$ |
| 1 | 0 | 0 | 1 | 0 | — | DIN | — | — | $\overline{R32}$ |
| 1 | 0 | 0 | 1 | 1 | DIN | — | — | — | $\overline{R33}$ |
| 1 | 0 | 1 | 0 | 0 | — | — | — | — | $\overline{R30}$ |
| 1 | 0 | 1 | 0 | 1 | — | — | — | — | $\overline{R31}$ |
| 1 | 0 | 1 | 1 | 0 | — | — | — | — | $\overline{R32}$ |
| 1 | 0 | 1 | 1 | 1 | — | — | — | — | $\overline{R33}$ |
| 1 | 1 | 1 | 0 | 1 | IB3 | IB2 | IB1 | IB0 | 1 |
| 1 | 1 | 1 | 1 | 0 | NA3 | NA2 | NA1 | NA0 | 1 |
| 1 | 1 | 1 | 1 | 1 | — | — | — | — | 1 |
| 1 | 1 | 0 | 0 | 0 | — | — | — | DIN | 1 |
| 1 | 1 | 0 | 0 | 1 | — | — | DIN | — | 1 |
| 1 | 1 | 0 | 1 | 0 | — | DIN | — | — | 1 |
| 1 | 1 | 0 | 1 | 1 | DIN | — | — | — | 1 |
| 1 | 1 | 1 | 0 | 0 | 0 | 0 | 0 | 0 | 1 |

TABLE 4

TRUTH TABLE FOR THE $\overline{XB}$ (EXTENDER BUS) LINE

| COMMENTS | REPEAT[1] FUNCTION | BRANCH DISABLE S5 | INSTRUCTION CONTROL I3-I0 MNEMONIC CODE | S4 | S2 | S1[2] | $\overline{XB}$[3] |
|---|---|---|---|---|---|---|---|
| Branch input or repeat function cannot affect the $\overline{XB}$ line on these instructions. | X | X | JSR + RPI + RTN + BRC + BSR + ROC | 1 | X | X | 1 |
| | | | | 0 | 0 | 0 | $\overline{R30}$ |
| | | | | 0 | 0 | 1 | $\overline{R31}$ |
| | | | | 0 | 1 | 0 | $\overline{R32}$ |
| | | | | 0 | 1 | 1 | $\overline{R33}$ |
| Branch input cannot affect the $\overline{XB}$ line when S5 = 1. | X | 1 | BRC + BSR + ROC | 1 | X | X | 1 |
| | | | | 0 | 0 | 0 | $\overline{R30}$ |
| | | | | 0 | 0 | 1 | $\overline{R31}$ |
| | | | | 0 | 1 | 0 | $\overline{R32}$ |
| | | | | 0 | 1 | 1 | $\overline{R33}$ |
| The Branch input is selected onto the $\overline{XB}$ line when S5 = 0 and the instruction is a BRC, BSR or ROC. | X | 0 | BRC + BSR + ROC | 1 | X | X | B |
| | | | | 0 | 0 | 0 | $\overline{B} \cdot \overline{R30}$ |
| | | | | 0 | 0 | 1 | $\overline{B} \cdot \overline{R31}$ |
| | | | | 0 | 1 | 0 | $\overline{B} \cdot \overline{R32}$ |
| | | | | 0 | 1 | 1 | $\overline{B} \cdot \overline{R33}$ |
| If the repeat function = 0, the $\overline{XB}$ line is unaffected by JSR, RPI, or RTN. | 0 | X | JSR + RPI + RTN | 1 | X | X | 1 |
| | | | | 0 | 0 | 0 | $\overline{R30}$ |
| | | | | 0 | 0 | 1 | $\overline{R31}$ |
| | | | | 0 | 1 | 0 | $\overline{R32}$ |
| | | | | 0 | 1 | 1 | $\overline{R33}$ |
| If the repeat function = 1, $\overline{XB}$ is forced to 0 on a JSR, RPI or RTN | 1 | X | JSR + RPI + RTN | X | X | X | 0 |

"X" represents a Don't Care Condition

NOTES:
[1] (RSQ) · $\overline{(R13 \cdot R12 \cdot R11 \cdot R10)}$ = Repeat Function
[2] S4 enables a bit from R3 to be placed on $\overline{XB}$; S1 and S2 select the bit from R3.
[3] The $\overline{XB}$ line can be forced to a "0" from an external chip using the negative logic "AND".

TABLE 5

TRUTH TABLE FOR R1 and RS FLIP-FLOP AS A FUNCTION OF SELECT LINE S6

| S6 | OUTPUTS $R1_0$–$R1_3$ | RSQ |
|---|---|---|
| 1 | —* | —* |
| 0 | $RO_0$–$RO_3$ | 0 |

*No change in R1 or RS except for I0-I3 conditions shown in Table 2

TABLE 6

SELECTING THE 1 BUS φ BUS AS DATA OUTPUTS

| INSTRUCTION CONTROL IC0 - IC3 MNEMONIC CODE | $\overline{RST}$ | S8 | S9 | S7 = 0 | | S7 = 1 | |
|---|---|---|---|---|---|---|---|
| | | | | φB | φB | IB | |
| X | X | 0 | 0 | 1 | R1 | R1 | 1 |
| JSR + BSR · XB | X | 0 | 1 | 1 | R7 | R7 | 1 |
| X | 0 | 0 | 1 | 1 | R7 | R7 | 1 |
| RTN + ROC · XB | 1 | 0 | 1 | 1 | 1 | 1 | 1 |
| $\overline{JSR + RTN + (BSR + ROC) \cdot XB}$ | 1 | 0 | 1 | 1 | R4 | R4 | 1 |
| · X | X | 1 | 0 | 1 | R2 | R2 | 1 |
| X | X | 1 | 1 | 1 | 1 | 1 | 1 |

TABLE 7

TRUTH TABLE FOR THE 4 × 4 LIFO STACK (REGISTERS R4-R7)

| INSTRUCTION CONTROL IC0 - IC3 MNENONIC CODE | $\overline{RST}$ | $\overline{XB}$ | RSQ | S7 | S8 | S9 | NEXT STATE R4 | R5 | R6 | R7 |
|---|---|---|---|---|---|---|---|---|---|---|
| RTN + RPI | 0 | X | 1 | X | X | X | R1 | R4 | R5 | R6 |
| RTN + RPI | 0 | X | 0 | X | X | X | R0 | R4 | R5 | R6 |
| $\overline{RTN + RPI}$ | 0 | X | X | X | X | X | R0 | R4 | R5 | R6 |
| JSR | 1 | X | 0 | X | X | X | R0 Plus $C_{IN}$ | R4 | R5 | R6 |
| JSR | 1 | 1 | 1 | X | X | X | R0 Plus $C_{IN}$ | R4 | R5 | R6 |
| JSR | 1 | 0 | 1 | X | X | X | R0 | R4 | R5 | R6 |
| BSR | 1 | 1 | X | X | X | X | — | — | — | — |
| BSR | 1 | 0 | X | X | X | X | R0 Plus $C_{IN}$ | R4 | R5 | R6 |
| RTN | 1 | X | X | X | 0 | 0 | R5 | R6 | R7 | 0 |
| RTN | 1 | X | X | X | 1 | X | R5 | R6 | R7 | 0 |
| RTN | 1 | X | X | 0 | 0 | 1 | R5 | R6 | R7 | IB |
| RTN | 1 | X | X | 1 | 0 | 1 | R5 | R6 | R7 | $\phi B$ |
| ROC | 1 | 1 | X | X | X | X | — | — | — | — |
| ROC | 1 | 0 | X | X | 0 | 0 | R5 | R6 | R7 | 0 |
| ROC | 1 | 0 | X | X | 1 | X | R5 | R6 | R7 | 0 |
| ROC | 1 | 0 | X | 0 | 0 | 1 | R5 | R6 | R7 | IB |
| ROC | 1 | 0 | X | 1 | 0 | 1 | R5 | R6 | R7 | $\phi B$ |
| $\overline{JSR + BSR + RTN + ROC}$ | 1 | X | X | X | X | X | — | — | — | — |

TABLE 8

TRUTH TABLE FOR $C_{OUT}$

| INSTRUCTION CONTROL I0-I3 | RSQ | $C_{OUT}$ |
|---|---|---|
| RPI + RTN | 0 | $C_{in} \cdot R03 \cdot R01 \cdot R01 \cdot R00$ |
| RPI + RTN | 1 | $C_{in} \cdot R13 \cdot R12 \cdot R11 \cdot R10$ |

TABLE 9

NON-REPEAT SUBROUTINE LISTING

| ADDRESS | I FIELD | NA FIELD | DESCRIPTION |
|---|---|---|---|
| 06 | JSR | 17 | 06 + 1 → R4; Push Stack; 17 → R0 |
| 07 | INC | X | Continue Program |
| — | | | |
| — | | | |
| — | | | |
| 17 | INC | X | Beginning of Subroutine |
| 18 | INC | X | |
| 19 | RTN | X | (R4) → R0; Pop Stack |

TABLE 10

REPEAT SUBROUTINE LISTING

| ADDRESS | I FIELD | NA FIELD | DESCRIPTION |
|---|---|---|---|
| 05 | RSR | FC | 1111 1100 → R1; 1 → RSQ |
| 06 | JSR | 17 | 06 + $C_{IN}$ Internal → R4; push Stack; 17 → R0. If RSQ = 0 or R1 = FF, then $C_{IN}$ Internal = 1. |
| 07 | INC | X | Continue Program |
| — | | | |
| — | | | |
| 17 | INC | X | Beginning of Subroutine |
| 18 | INC | X | |
| 19 | RTN | X | (R4) → R0; Pop Stack; if RSO = 1 and R1 = FF, then (R1) + 1 → R1; if R1 = FF, then 0 → RSQ |

TABLE 11

| ADDRESS | REPEAT INSTRUCTION LISTING | | |
|---|---|---|---|
| | I FIELD | NA FIELD | DESCRIPTION |
| 09 | RSR | FC | 1111 1100 → R1; 1 → RSQ |
| ←  OA | RPI | 11 | If RSQ = 1 and R1 = FF, then (R1) + 1 → R1, (RO) → RO. If R1 = FF, then 0 → RSQ (11 · FF) → RO |
| → 11 | INC | | Continue Program |

While the invention has been described in connection with certain preferred embodiments, it is not intended that the invention be limited thereto. Thus, it is intended that the invention cover all alternative arrangements, equivalents, and embodiments as may be included within the scope of the following claims.

What is claimed is:

1. In a data processing having a memory for storing instructions and an instruction execution means, a memory address controlling device comprising:
   (a) means for accepting a plurality of addresses and other signals, and means for accepting having a plurality of control inputs,
   (b) means responsive to said control inputs for selecting one of said plurality of addresses,
   (c) first storage means coupled to said means for selecting for storing said selected address from said means for selecting,
   (d) second storage means coupled to said means for selecting and capable of selectively storing an address from said first storage means or said other signals representing an initial count from said means for selecting,
   (e) means for loading said selected address into said first storage means,
   (f) means for loading said count into said second storage means,
   (g) means for addressing said memory at said selected address in said first storage means,
   (h) means for modifying said count in said second storage means and means for repeatedly addressing said memory at the address contained in said first storage means and modifying said count in said second storage means until the count in said second storage means reaches a predetermined value,
   (i) whereby a new address from said means for selecting is loaded into said first storage means to address a new location in said memory.

2. A memory address controlling device as set forth in claim 1 wherein said means for modifying said a count is an incrementing means, and further comprising:
   (a) a register coupled to said incrementing means,
   (b) means for storing an address contained in said first storage means in said register,
   (c) means responsive to additional control inputs for selecting a second address and storing said second address in said first storage means,
   (d) whereby said memory may be addressed at the address in said first storage means.

3. A memory address controlling device as set forth in claim 2 further comprising means for returning the address from said register to said first storage means.

4. A memory address controlling device as set forth in claim 3 wherein said initial count is derived from a field of an instruction being executed by said instruction execution means.

5. A memory address controlling device as set forth in claim 3 wherein said returned address in said first storage means is incremented prior to storage in said register.

6. A memory address controlling device as set forth in claim 1 in which said new address is provided by a field from an instruction being executed by said instruction execution means.

* * * * *